(12) United States Patent
Yoo et al.

(10) Patent No.: US 9,593,883 B2
(45) Date of Patent: Mar. 14, 2017

(54) MODULE FOR TREATMENT OF CARBON DIOXIDE AND TREATMENT METHOD THEREOF

(75) Inventors: Byeong Yong Yoo, Seoul (KR); Sung Bae Kim, Seoul (KR); Il Guk Woo, Seoul (KR); Yeong Tae Oh, Gwangmyeong-si (KR); Hee Seung Na, Seoul (KR)

(73) Assignee: DAEWOO SHIPBUILDING & MARINE ENGINEERING CO., LTD., Seoul (KR)

( * ) Notice: Subject to any disclaimer, the term of this patent is extended or adjusted under 35 U.S.C. 154(b) by 226 days.

(21) Appl. No.: 14/369,405

(22) PCT Filed: Aug. 22, 2012

(86) PCT No.: PCT/KR2012/006660
§ 371 (c)(1),
(2), (4) Date: Jun. 27, 2014

(87) PCT Pub. No.: WO2013/100304
PCT Pub. Date: Jul. 4, 2013

(65) Prior Publication Data
US 2014/0360226 A1 Dec. 11, 2014

(30) Foreign Application Priority Data

Dec. 27, 2011 (KR) .......................... 10-2011-0143400
Dec. 27, 2011 (KR) .......................... 10-2011-0143401

(51) Int. Cl.
*F25J 3/00* (2006.01)
*F25J 3/02* (2006.01)
(Continued)

(52) U.S. Cl.
CPC ............. *F25J 3/0266* (2013.01); *C10L 3/104* (2013.01); *F25J 1/0027* (2013.01); *F25J 3/0209* (2013.01);
(Continued)

(58) Field of Classification Search
CPC ........ F25J 3/0266; F25J 3/0209; F25J 3/0233; F25J 2220/66; F25J 2280/40;
(Continued)

(56) References Cited

U.S. PATENT DOCUMENTS 5,956,971 A * 9/1999 Cole ...................... F25J 1/0202
62/623
6,070,431 A * 6/2000 Howard .................. C01B 31/20
62/620
(Continued)

FOREIGN PATENT DOCUMENTS

JP 06-018165 A 1/1994
JP 2011-507680 A 3/2011
(Continued)

OTHER PUBLICATIONS

International Search Report dated Feb. 20, 2013 of PCT/KR2012/006660 which is the parent application and its English translation—4 pages.

*Primary Examiner* — Keith Raymond
(74) *Attorney, Agent, or Firm* — Knobbe Martens Olson & Bear LLP

(57) ABSTRACT

Liquid carbon dioxide separated from sour gas is expanded by throttling decompression and is gas-liquid separated at a low temperature so as to be supplied for shipping or the improvement of petroleum recovery. Methane generated from a stranded gas well is allowed to pass as a coolant through liquid carbon dioxide separated and discharged from sour gas generated from the stranded gas well so as to (Continued)

cool liquid carbon dioxide. Disclosed is a module for treating carbon dioxide, and a treatment method thereof for supplying liquid carbon dioxide at a proper temperature and state conditions when there is a need for liquid carbon dioxide of very low temperature for the storage or collection of carbon dioxide, the improvement of petroleum recovery, or the like by cooling carbon dioxide using a material separated from sour gas of a stranded gas well as a coolant.

5 Claims, 3 Drawing Sheets

(51) Int. Cl.
*C10L 3/10* (2006.01)
*F25J 1/00* (2006.01)
(52) U.S. Cl.
CPC .......... *F25J 3/0233* (2013.01); *F25J 2200/02* (2013.01); *F25J 2200/74* (2013.01); *F25J 2215/04* (2013.01); *F25J 2220/82* (2013.01); *F25J 2260/80* (2013.01); *F25J 2270/02* (2013.01); *F25J 2270/08* (2013.01); *F25J 2280/40* (2013.01); *F25J 2290/34* (2013.01); *Y02C 10/12* (2013.01)

(58) Field of Classification Search
CPC .. F25J 2205/10; F25J 2205/20; F25J 2200/02; F25J 2200/74; F25J 2215/04; F25J 2220/82; F25J 2260/80; F25J 2270/02; F25J 2270/08; F25J 2290/34; C10L 3/104; Y02C 10/12
See application file for complete search history.

(56) References Cited

U.S. PATENT DOCUMENTS

2005/0011646 A1* 1/2005 Appleford .......... B01D 21/0024
  166/267
2010/0251763 A1* 10/2010 Audun ................... B63B 25/16
  62/614

FOREIGN PATENT DOCUMENTS

| KR | 10-0338881 B1 | 5/2002 |
|----|---------------|--------|
| KR | 10-2007-0083907 A | 8/2007 |
| KR | 10-2010-0074268 A | 7/2010 |

* cited by examiner

MODULE FOR TREATMENT OF CARBON DIOXIDE AND TREATMENT METHOD THEREOF

TECHNICAL FIELD

The present invention relates to a module for treatment of carbon dioxide and an operation method thereof, and more particularly, to a module for treatment of carbon dioxide for supplying liquid carbon dioxide at a suitable temperature in a suitable condition to a demand side of liquid carbon dioxide at cryogenic temperature for shipping, storage and capture of carbon dioxide, enhanced oil recovery, or the like, and a treatment method thereof.

BACKGROUND ART

With industrial development and population growth, demand for energy has increased, leading to depletion of petroleum resources and rapid increase in demand for natural gas, which is thought to be more plentiful than petroleum.

Natural gas is classified into sweet gas having a high content of methane and sour gas containing corrosive and toxic hydrogen sulfide. Recently, the number of gas wells capable of supplying sweet gas has gradually decreased.

Accordingly, although development of stranded gas wells generating sour gas has been avoided due to low economic efficiency, demand for development of the stranded gas wells is gradually increasing.

In development of the stranded gas well, apparatuses and plants for separating carbon dioxide and hydrogen sulfide gas from sour gas must be installed and constructed. Here, carbon dioxide generated as a by-product in production of natural gas is discharged into the atmosphere or stored underground via conduits.

Therefore, in development of the stranded gas well, an underground storage for storing separated carbon dioxide is necessarily placed near the stranded gas well. Further, if regulations on carbon dioxide emissions are further tightened in the future, development of stranded gas wells using such apparatuses and plants will be impossible without underground storage of carbon dioxide.

DISCLOSURE

Technical Problem

The present invention has been conceived to solve such a problem in the art, and an aspect of the present invention is to provide a module for treatment of carbon dioxide for supplying liquid carbon dioxide at a suitable temperature in a suitable condition to a demand side of liquid carbon dioxide at cryogenic temperature for shipping, storage and capture of carbon dioxide, enhanced oil recovery, or the like, and a treatment method thereof.

Technical Solution

In accordance with one aspect of the present invention, a module for treatment of carbon dioxide includes: a separation unit formed at the middle thereof with a controlled freezing zone (CFZ) and discharging methane upwards while discharging carbon dioxide contained in sour gas generated from a stranded gas well downwards; a gas-liquid separator connected to the separation unit and separating carbon dioxide into gas and liquid; and an expansion valve disposed between the separation unit and the gas-liquid separator and expanding liquid carbon dioxide discharged from the separation unit by throttling decompression.

In addition, temperature at an inlet of the expansion valve may be higher than temperatures at a gas outlet and a liquid outlet of the gas-liquid separator.

Further, the gas-liquid separator may discharge gas carbon dioxide upwards and discharge liquid carbon dioxide downwards.

Further, the gas-liquid separator may include a liquid discharge pipe through which the liquid carbon dioxide is discharged downwards in a saturated liquid state at $-55°$ C. to $-20°$ C.; and a flow control valve mounted on an end portion of the liquid discharge pipe and controlling supply of the liquid carbon dioxide for shipping, carbon dioxide capture and storage (CCS) or enhanced oil recovery (EOR).

Further, the gas-liquid separator may include: a gas discharge pipe through which gas carbon dioxide is discharged upwards; and a pressure control valve mounted on the gas discharge pipe.

In accordance with another aspect of the present invention, a module for treatment of carbon dioxide includes: a separation unit separating and discharging carbon dioxide from sour gas generated in a stranded gas well; an expansion valve expanding liquid carbon dioxide received from the separation unit by throttling decompression; and a gas-liquid separator separating gas and liquid carbon dioxide from a two-phase fluid of gas and liquid carbon dioxide having passed through the expansion valve.

In accordance with a further aspect of the present invention, a method for treating carbon dioxide includes: additionally cooling and supplying liquid carbon dioxide in a saturated liquid state at $-55°$ C. to $-20°$ C. for shipping or enhanced oil recovery (EOR), wherein the liquid carbon dioxide is produced from a separation unit formed at the middle thereof with a controlled freezing zone (CFZ) and discharging methane upwards while discharging carbon dioxide contained in sour gas generated from a stranded gas well downwards.

Here, the additional cooling may be performed by expanding the liquid carbon dioxide discharged from the separation unit through throttling decompression.

The additional cooling may be performed by expanding the liquid carbon dioxide discharged from the separation unit through throttling decompression; and separating a two-phase fluid of gas and liquid carbon dioxide expanded by throttling decompression into gas and liquid carbon dioxide while passing through a gas-liquid separator.

In accordance with yet another aspect of the present invention, there is provided a method for treating carbon dioxide, in which liquid carbon dioxide separated from sour gas may be expanded by throttling-decompression, subjected to gas-liquid separation at low temperature, and supplied for shipping or enhanced oil recovery.

In accordance with yet another aspect of the present invention, a module for treating liquid carbon dioxide may include: a separation unit formed at the middle thereof with a controlled freezing zone (CFZ) and discharging methane upwards while discharging carbon dioxide contained in sour gas generated from a stranded gas well downwards; and a heat exchanger which cools liquid carbon dioxide discharged from the separation unit using the methane discharged from the separation unit as a coolant and is mounted on piping through which the liquid carbon dioxide is discharged from the separation unit.

Here, a decompression valve may be mounted on the piping connecting the separation unit to the heat exchanger, thereby decreasing pressure to be suitable for shipping.

The decompression valve may be mounted on the piping at an outlet of the heat exchanger.

The liquid carbon dioxide having passed through the heat exchanger and the decompression valve may be loaded onto a ship and transported for carbon dioxide capture and storage (CCS) or for enhanced oil recovery (EOR).

In accordance with yet another aspect of the present invention, there is provided a module for treatment of carbon dioxide, in which methane discharged from a separation unit separating and discharging carbon dioxide from sour gas produced in a stranded gas well passes as a coolant through a heat exchanger mounted on piping forming a flow passage of liquid carbon dioxide discharged from the separation unit such that the liquid carbon dioxide is cooled by the methane while passing through the heat exchanger.

In accordance with yet another aspect of the present invention, there is provided a method of treating carbon dioxide, in which methane generated from a stranded gas well passes as a coolant through liquid carbon dioxide separated from sour gas produced in the stranded gas well, such that the liquid carbon dioxide is cooled by the methane.

In accordance with yet another aspect of the present invention, a method of treating carbon dioxide includes: a first step of supplying sour gas to a separation unit connected to a stranded gas well via piping and forming a controlled freezing zone (CFZ); a second step of distilling the sour gas in the separation unit, and discharging methane from the separation unit upwards while discharging liquid carbon dioxide from the separation unit downwards; a third step of cooling the liquid carbon dioxide by passing the methane as a coolant through a heat exchanger mounted on piping for discharging the liquid carbon dioxide of the separation unit; and a fourth step of loading a ship with the liquid carbon dioxide having passed through the heat exchanger, and transporting the liquid carbon dioxide for carbon dioxide capture and storage (CCS) or for enhanced oil recovery (EOR).

Here, the second step may further include decompressing the liquid carbon dioxide discharged from the separation unit via a decompression valve mounted on the piping between the separation unit and the heat exchanger or the piping at an outlet of the heat exchanger.

In accordance with yet another aspect of the present invention, a module for treatment of liquefied carbon dioxide includes: a separation unit formed at the middle thereof with a controlled freezing zone (CFZ) and discharging methane upwards while discharging carbon dioxide contained in sour gas generated from a stranded gas well downwards; a heat exchanger which cools liquid carbon dioxide discharged from the separation unit using the methane discharged from the separation unit as a coolant and is mounted on piping through which the liquid carbon dioxide is discharged from the separation unit; and a gas-liquid separator connected to the heat exchanger and separating the carbon dioxide into gas and liquid carbon dioxide in a saturated liquid state at −55° C. to −20° C.

Here, the gas-liquid separator may discharge gas carbon dioxide upwards while discharging liquid carbon dioxide downwards.

An expansion valve may be mounted on the piping connecting the separation unit to the heat exchanger, or on the piping at an outlet of the heat exchanger.

In accordance with yet another aspect of the present invention, a method of treating carbon dioxide comprising: a first step of supplying sour gas to a separation unit connected to a stranded gas well via piping and forming a controlled freezing zone (CFZ); a second step of cooling liquid carbon dioxide by passing methane as a coolant through a heat exchanger mounted on piping for discharging the liquid carbon dioxide of the separation unit; a third step of separating the liquid carbon dioxide cooled by heat exchange into gas and liquid through a gas-liquid separator connected to the heat exchanger; and a fourth step of loading a ship with the liquid carbon dioxide having passed through the gas-liquid separator, and transporting the liquid carbon dioxide for carbon dioxide capture and storage (CCS) or for enhanced oil recovery (EOR).

Advantageous Effects

With the foregoing features and embodiments, the present invention has advantageous effects as follows.

First, according to the present invention, the expansion valve is disposed between the separation unit and the gas-liquid separator such that liquid carbon dioxide discharged from the separation unit is expanded through throttling decompression and separated at low temperature into gas carbon dioxide and liquid carbon dioxide, thereby allowing the liquid carbon dioxide to be transported for CCS or sold for EOR.

In addition, according to the present invention, sour gas produced from a stranded gas well is distilled in the separation unit forming a controlled freezing zone, such that separated and discharged methane can be used as a coolant, thereby allowing liquid carbon dioxide to be easily transported for CCS or sold for EOR while greatly reducing load for cooling the liquid carbon dioxide.

Further, according to the present invention, it is possible to significantly reduce costs for building and constructing treatment facilities to liquefy carbon dioxide, thereby providing economic feasibility in the case where a CFZ technique is used to treat a large amount of carbon dioxide generated as a by-product in production of natural gas in the existing stranded gas well without any facilities for treating carbon dioxide, and carbon dioxide must be transported long distances due to the absence of storage for carbon dioxide in the vicinity.

Further, according to the present invention, the amount of carbon dioxide gas, which is generated from the separation module forming the installed and constructed controlled freezing zone (CFZ) and discharged into the atmosphere, is greatly reduced, thereby providing environmentally friendliness while satisfying regulations on exhaustion of carbon dioxide anticipated to be further tightened.

EMBODIMENTS

Hereinafter, embodiments of the present invention will be described in detail with reference to the accompanying drawings.

Figure 1:
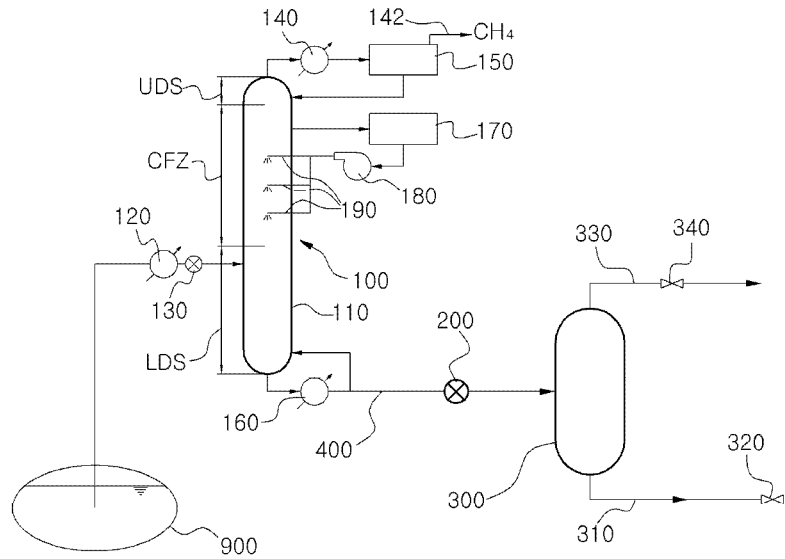
FIG. 1 is a conceptual view of a module for treatment of carbon dioxide according to one embodiment of the present invention.

FIG. 1 is a conceptual view of an additional cooling module for carbon dioxide according to one embodiment of the present invention.

As shown therein, the cooling module for carbon dioxide according to this embodiment of the present invention includes a separation unit 100 which separates and discharges carbon dioxide from sour gas generated in a stranded gas well 900, an expansion valve 200 which expands liquid carbon dioxide received from the separation unit 100 through throttling decompression, and a gas-liquid separator 300 which separates gas and liquid carbon dioxide from a two-phase fluid of gas and liquid carbon dioxide having passed through the expansion valve 200.

The present invention is applicable to the foregoing embodiment and also applicable to the following embodiments.

First, the separation unit 100 is formed at the middle thereof with a controlled freezing zone (CFZ) and discharges methane ($CH_4$, sweet gas) upwards while discharging carbon dioxide contained in sour gas generated in the stranded gas well 900 downwards.

The separation unit 100 distills and separates respective components, such as carbon dioxide, hydrogen sulfide, methane, and the like, contained in the sour gas generated from the stranded gas well.

Specifically, in the separation unit 100, an upper side of a separation tank 110 constitutes an upper distillation sector (UDS) for discharging methane (CH4), and a lower side of the separation tank 110 constitutes a lower distillation sector (LDS) for discharging carbon dioxide.

First, the separation tank 110 is connected to the stranded gas well 900 via piping, and the sour gas supplied from the stranded gas well 900 is cooled and expanded by decompression through a cooler 120 and a gas expansion valve 130 sequentially mounted on the piping connecting the stranded gas well 900 to the separation tank 110 to allow the sour gas to be cooled and expanded by decompression at a temperature suitable for distillation inside the separation tank 110.

A reheater 160 is provided to a lower side of the separation tank 110 and heats the discharged liquid carbon dioxide such that some liquid carbon dioxide can return to the separation tank 110 and the remainder can be discharged, and a condenser 140 is provided to an upper side of the separation tank 110 and condenses sweet gas ($CH_4$) in the heated sour gas vapor to be accommodated in a temporary storage tank 150 and supplied to a demand side requiring natural gas via a gas discharge pipe 142.

In the CFZ, liquid gas mixed with carbon dioxide and the like is stored in a temporary reservoir 170, and injected by a pump 180 into the separation tank 110 via an injection pipe 190 having a nozzle (not shown) at one end thereof, thereby decreasing load due to separation of the sweet gas ($CH_4$).

The expansion valve 200 is connected to the separation unit 100, i.e., the lower side of the separation tank 110, and is mounted on a discharge pipe 400, from which liquid carbon dioxide is discharged, such that the liquid carbon dioxide is cooled to low temperature through expansion by throttling-compression.

The gas-liquid separator 300 is connected to an end portion of the discharge pipe 400 and separates carbon dioxide into gas and liquid.

Here, temperature at an inlet of the expansion valve 200 approximately ranges from 1° C. to 5° C., and is typically about 2.2° C., and temperature at a gas outlet or a liquid outlet of the gas-liquid separator 300 next the expansion valve 200 approximately ranges from −55° C. to −20° C.

These temperature conditions are suitable for transportation for carbon dioxide capture and storage (CCS) or for enhanced oil recovery (EOR) using a ship.

The gas-liquid separator 300 discharges carbon dioxide gas upwards and discharges liquid carbon dioxide downwards.

That is, as shown therein, the gas-liquid separator 300 may include a liquid discharge pipe 310 for discharging liquid carbon dioxide downwards, and a flow control valve 320 mounted on an end portion of the liquid discharge pipe 310.

The flow control valve 320 serves to adjust supply of liquid carbon dioxide for the carbon dioxide capture and storage (CCS) or the enhanced oil recovery (EOR).

In addition, the gas-liquid separator 300 may further include a gas discharge pipe 330 for discharging carbon dioxide gas upwards, and a pressure control valve 340 mounted on the gas discharge pipe 330 to be opened or closed such that carbon dioxide gas can be discharged when inner pressure of the gas-liquid separator 300 is equal to or higher than a preset pressure.

An additional cooling method of liquid carbon dioxide using the module for treatment of carbon dioxide according to the above embodiment of the invention will be described with reference to FIG. 2.

Figure 2:
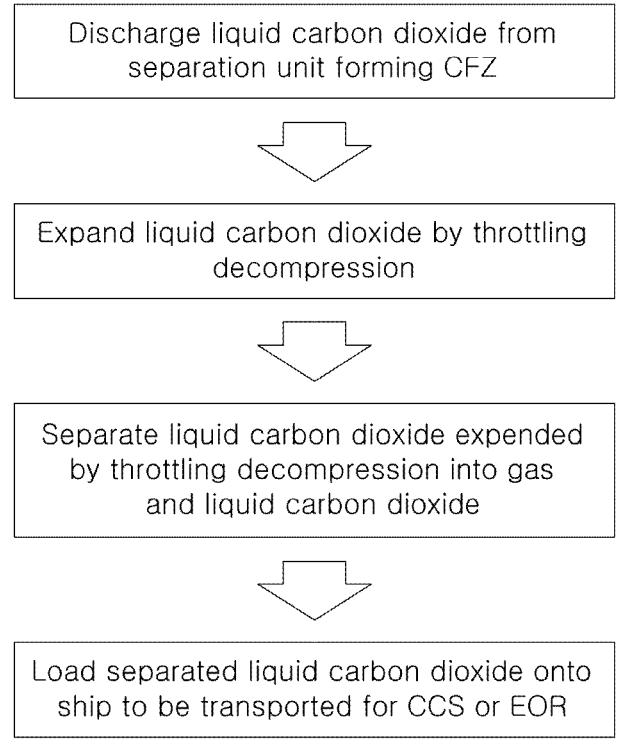
FIG. 2 is a block diagram of a method of treating carbon dioxide according to one embodiment of the present invention.

FIG. 2 is a block diagram of a method of treating carbon dioxide according to one embodiment of the present invention, and reference numerals not shown in FIG. 2 will be described with reference to FIG. 1.

It will be appreciated that the present invention is applicable to an embodiment in which liquid carbon dioxide separated from sour gas is expanded by throttling decompression and is subjected to gas-liquid separation at low temperature to be supplied for shipping or enhanced oil recovery.

That is, according to the embodiment of the present invention, liquid carbon dioxide discharged from the separation unit 100 is additionally cooled at low temperature and supplied at temperature and pressure suitable for shipping.

Here, additional cooling is achieved as liquid carbon dioxide discharged from the separation unit 100 is expanded by throttling decompression while passing through the expansion valve 200.

That is, additional cooling is achieved as a two-phase fluid of gas and liquid carbon dioxide expanded by throttling decompression is separated into gas carbon dioxide and liquid carbon dioxide while passing through the gas-liquid separator 300.

Liquid carbon dioxide having a temperature of about 2.2° C. and discharged from the separation unit 100 is cooled to a temperature of about −55° C. to about −20° C. through the expansion valve 200 and the gas-liquid separator 300, and then loaded onto a ship for transporting carbon dioxide.

Below, a module for treatment of carbon dioxide and a treatment method thereof will be described according to another embodiment.

Figure 3:
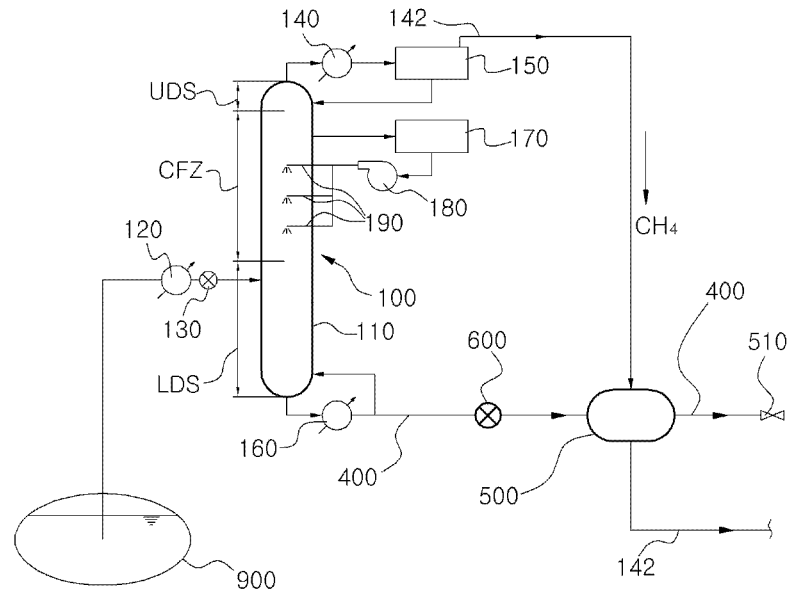
FIG. 3 is a conceptual view of a module for treatment of carbon dioxide according to another embodiment of the present invention.

FIG. 3 is a conceptual view of a module for treatment of carbon dioxide according to another embodiment of the present invention.

As shown therein, the present invention has a structure wherein methane discharged from a separation unit 100 separating and discharging carbon dioxide from sour gas produced in a stranded gas well 900 passes as a coolant through a heat exchanger 500 mounted on piping 400 forming a flow passage for liquid carbon dioxide discharged from the separation unit 100, such that the liquid carbon dioxide is cooled using the methane while passing through a heat exchanger 500.

The present invention is applicable to the foregoing embodiment and also applicable to the following embodiments.

First, the separation unit 100 is formed at the middle thereof with a controlled freezing zone (CFZ) and discharges methane ($CH_4$) upwards while discharging carbon dioxide contained in sour gas generated in the stranded gas well 900 downwards.

The separation unit 100 distills and separates respective components, such as carbon dioxide, hydrogen sulfide, methane, and the like, contained in the sour gas generated from the stranded gas well.

Specifically, in the separation unit 100, an upper side of a separation tank 110 constitutes an upper distillation sector (UDS) for discharging methane, and a lower side of the separation tank 110 constitutes a lower distillation sector (LDS) for discharging carbon dioxide.

First, the separation tank 110 is connected to the stranded gas well 900 via piping, and the sour gas supplied from the stranded gas well 900 is cooled and expanded by decompression through a cooler 120 and a gas expansion valve 130 sequentially mounted on the piping connecting the stranded gas well 900 to the separation tank 110 to allow the sour gas to be cooled and expanded by decompression at a temperature suitable for distillation inside the separation tank 110.

A reheater 160 is provided to a lower side of the separation tank 110 and heats the discharged liquid carbon dioxide such that some liquid carbon dioxide can return to the separation tank 110 and the remainder can be discharged, and a condenser 140 is provided to an upper side of the separation tank 110 and condenses methane in the heated sour gas vapor to be accommodated in a temporary storage tank 150 and supplied to a demand side requiring natural gas via a gas discharge pipe 142.

In the CFZ, liquid gas mixed with carbon dioxide and the like is stored in a temporary reservoir 170, and injected by a pump 180 into the separation tank 110 via an injection pipe 190 having a nozzle (not shown) at one end thereof, thereby decreasing load due to separation of methane.

The heat exchanger 500 is mounted on piping 400 through which liquid carbon dioxide is discharged from the separation unit 100, and serves to cool liquid carbon dioxide discharged from the separation unit 100 using the methane discharged from the separation unit 100 as a coolant.

To this end, the heat exchanger 500 communicates with the foregoing gas discharge pipe 142, and the liquid carbon dioxide flowing in the piping 400 is cooled by cold methane (having a temperature of about $-90°$ C. to $-80°$ C.) supplied into the heat exchanger 500 via the gas discharge pipe 142.

Here, temperature at an inlet of the heat exchanger 500 approximately ranges from $1°$ C. to $5°$ C., and is typically about $2.2°$ C., and the temperature of liquid carbon dioxide having passed through the heat exchanger 500 approximately ranges from $-55°$ C. to $-20°$ C.

Thus, the liquid carbon dioxide is cooled to a temperature suitable for shipping and loaded onto a ship for transportation for carbon dioxide capture and storage (CCS) or enhanced oil recovery (EOR).

A decompression valve 600 may be mounted on the piping 400 connecting the separation unit 100 to the heat exchanger 500 or may be mounted on the piping 400 at the outlet of the heat exchanger 500.

The decompression valve 600 is connected to the separation unit 100, i.e., the lower side of the separation tank 110, and mounted on the piping 400 through which the liquid carbon dioxide is discharged, thereby lowering the pressure of the liquid carbon dioxide to be suitable for shipping.

Since the liquid carbon dioxide separated through the separation unit 100 has a high pressure of about 37 bar, the decompression valve 600 lowers the pressure of the liquid carbon dioxide to a saturated pressure of 5.5 bar ~19.7 bar at a temperature of $-55°$ C. to $-20°$ C.

In general, saturated carbon dioxide having a temperature of $-50°$ C. to $-30°$ C. is considered suitable for shipping. Therefore, the decompression valve 600 preferably performs decompression to achieve a pressure of 6.8 bar ~14.3 bar.

A method of treating carbon dioxide using the module for treatment of carbon dioxide according to the above embodiment of the invention will be described with reference to FIG. 4.

Figure 4:
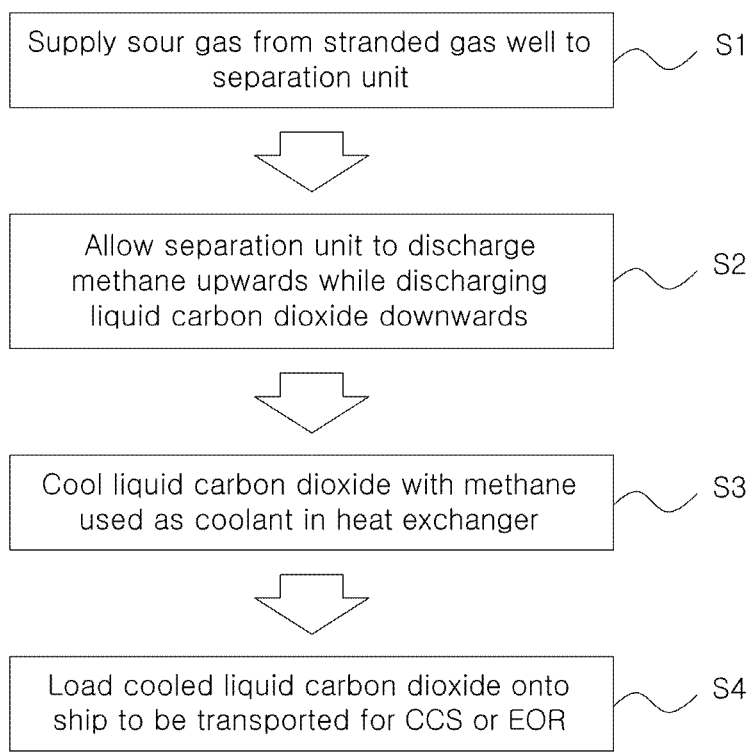
FIG. 4 is a block diagram of a method of treating carbon dioxide according to another embodiment of the present invention.

FIG. 4 is a block diagram of a method of treating carbon dioxide according to another embodiment of the present invention, and reference numerals not shown in FIG. 4 will be described with reference to FIG. 3.

It will be appreciated that the present invention is applicable to an embodiment in which liquid carbon dioxide separated from sour gas generated from a stranded gas well is cooled by allowing methane generated from the stranded gas well to pass as a coolant through liquid carbon dioxide.

That is, according to the embodiment of the present invention, liquid carbon dioxide discharged from the separation unit 100 is additionally cooled to a low temperature and supplied in a state suitable for shipping.

More specifically, in first step S1, sour gas is supplied to the separation unit 100 that is connected to the stranded gas well via by piping and forms the controlled freezing zone (CFZ), thereby producing methane via distillation.

In second step S2, the sour gas is distilled in the separation unit 100 such that the separation unit 100 discharges methane upwards while discharges liquid carbon dioxide downwards.

In third step S3, methane discharged through the gas discharge pipe 142 connected to the separation unit 100 is forced to pass as a coolant through the heat exchanger 500 mounted on the piping 400 for discharging liquid carbon dioxide from the separation unit 100, thereby performing cooling operation.

Subsequently, in fourth step S4, the liquid carbon dioxide having passed through the heat exchanger 500 is loaded onto a ship and transported for carbon dioxide capture and storage (CCS) or for enhanced oil recovery (EOR).

In second step S2, the liquid carbon dioxide is subjected to decompression to a pressure suitable for shipping through the decompression valve 600 mounted on the piping 400 between the separation unit 100 and the heat exchanger 500 or at an outlet of the heat exchanger 500.

Liquid carbon dioxide having a temperature of about $2.2°$ C. and discharged from the separation unit 100 is cooled to a temperature from about $-55°$ C. to about $-20°$ C., more preferably from about $-50°$ C. to $-30°$ C., through the decompression valve 600 and the heat exchanger 500, and then loaded onto a ship for transporting carbon dioxide.

At this time, the liquid carbon dioxide may have a pressure of 5.5 bar to 19.7 bar, more preferably about 14.3 bar and then be loaded onto the ship for transporting carbon dioxide.

Below, a module for treatment of carbon dioxide and a treatment method thereof will be described according to a further embodiment of the present invention.

Figure 5:
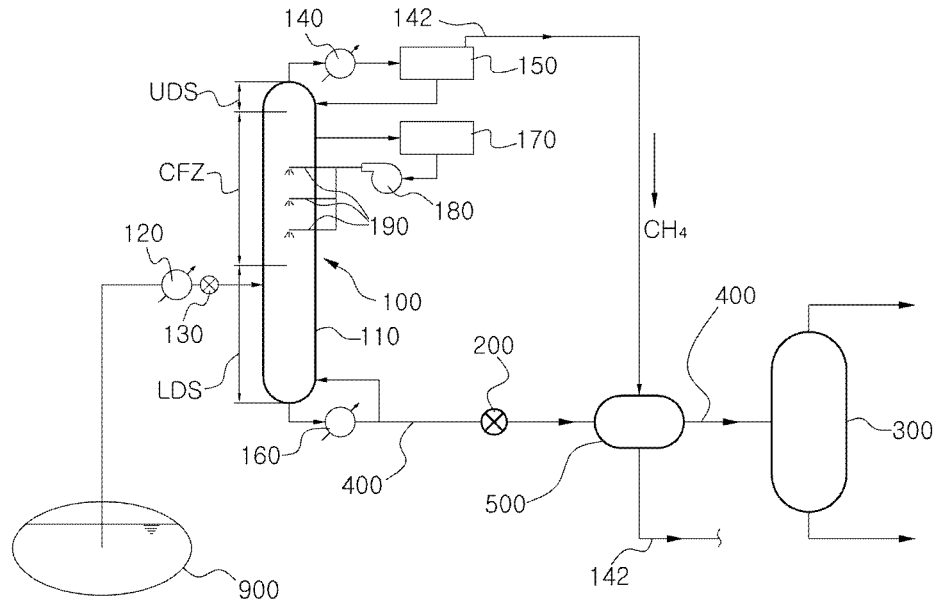
FIG. 5 is a conceptual view of a module for treatment of carbon dioxide according to a further embodiment of the present invention.

FIG. 5 is a conceptual view of a module for treatment of carbon dioxide according to a further embodiment of the present invention.

As shown therein, the module for treatment of carbon dioxide according to this embodiment of the present invention includes a separation unit 100 which separates and discharges carbon dioxide from sour gas generated in a stranded gas well 900, a heat exchanger 500 mounted on piping 400 forming a flow passage for liquid carbon dioxide discharged from the separation unit 100, and a gas-liquid separator 300 which separates gas and liquid carbon dioxide from a two-phase fluid of gas and liquid carbon dioxide having passed through the expansion valve 500.

The separation unit 100 is formed at the middle thereof with a controlled freezing zone (CFZ) and discharges, methane upwards while discharging carbon dioxide contained in the sour gas generated in the stranded gas well 900 downwards.

The separation unit 100 is similar to those of the foregoing embodiments and detailed descriptions thereof will be omitted for convenience.

The heat exchanger 500 cools liquid carbon dioxide discharged from the separation unit 100 using methane discharged from the separation unit 100 as a coolant and is mounted on piping, through which the liquid carbon dioxide is discharged from the separation unit 100.

To this end, the heat exchanger 500 communicates with the gas discharge pipe 142, and the liquid carbon dioxide flowing in the piping 400 is cooled by cold methane (having a temperature of about −90° C. to −80° C.) supplied into the heat exchanger 500 via the gas discharge pipe 142.

The gas-liquid separator 300 is connected to the heat exchanger 500 and separates carbon dioxide into gas and liquid carbon dioxide in a saturated liquid state at −55° C. to −20° C., and discharges carbon dioxide gas upwards while discharging liquid carbon dioxide downwards.

The gas-liquid separator 300 is connected to an end portion of the discharge pipe 400 and separates carbon dioxide into gas and liquid carbon dioxide.

Here, an expansion valve 200 is mounted on piping connecting the separation unit 100 to the heat exchanger 500, or on the piping at an outlet of the heat exchange 500, such that the liquid carbon dioxide is cooled to low temperature through expansion by throttling decompression.

Here, temperature at an inlet of the expansion valve 200 approximately ranges from 1° C. to 5° C., and is typically about 2.2° C., and temperature at a gas outlet or a liquid outlet of the gas-liquid separator 300 next the expansion valve 200 approximately ranges from −55° C. to −20° C.

These temperature conditions are suitable for transportation for carbon dioxide capture and storage (CCS) or for enhanced oil recovery (EOR) using a ship.

A method of treating carbon dioxide using the foregoing module for treatment of carbon dioxide according to still another embodiment of the present invention will be described with reference to FIG. 6.

Figure 6:
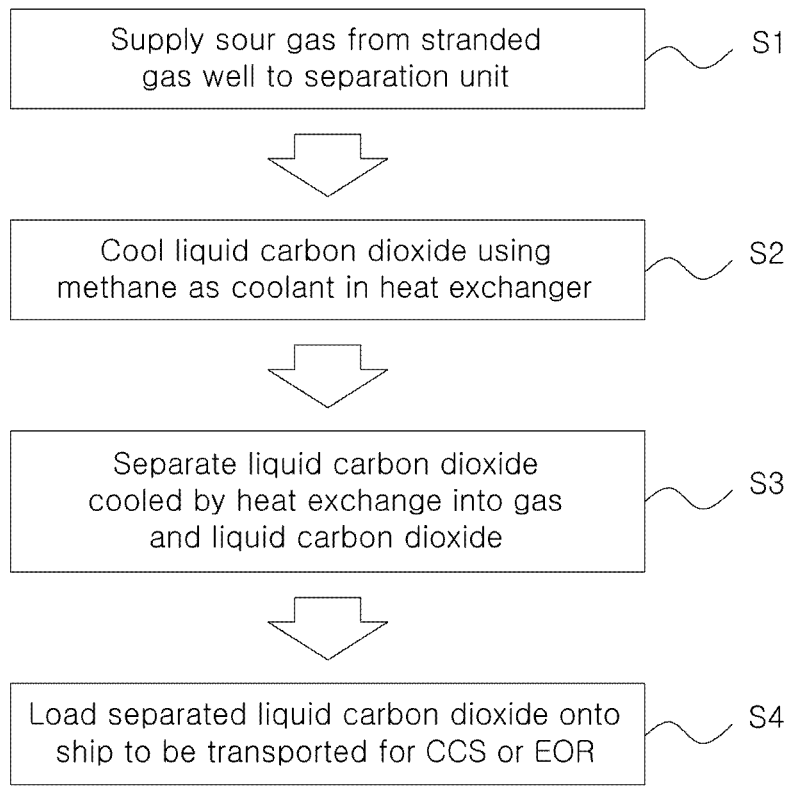
FIG. 6 is a block diagram of a method of treating carbon dioxide according to a further embodiment of the present invention.

FIG. 6 is a block diagram of a method of treating carbon dioxide according to yet another embodiment of the present invention, and reference numerals not shown in FIG. 6 will be described with reference to FIG. 5.

It will be appreciated that the present invention is applicable to an embodiment in which methane generated in a stranded gas well is used as a coolant, and carbon dioxide also separated from the stranded gas well passes through the heat exchanger 500 to be cooled by methane used as a coolant and is separated into gas and liquid in the gas-liquid separator 300.

More specifically, in first step S1, sour gas is supplied to the separation unit 100 that is connected to the stranded gas well by piping and forms the controlled freezing zone (CFZ).

In second step S2, methane is forced to pass as a coolant through the heat exchanger 500 mounted on the piping for discharging liquid carbon dioxide from the separation unit 100, thereby performing cooling operation.

In third step S3, the liquid carbon dioxide cooled by heat exchange is separated by the gas-liquid separator 300 connected to the heat exchanger 500 into gas and liquid.

In fourth step S4, the liquid carbon dioxide having passed through the gas-liquid separator 300 is loaded onto a ship and transported for carbon dioxide capture and storage (CCS) or enhanced oil recovery (EOR).

Here, liquid carbon dioxide having a temperature of about 2.2° C. and discharged from the separation unit 100 is cooled to a temperature from about −55° C. to about −20° C., more preferably about −30° C., through the decompression valve 600 and the heat exchanger 500, and then loaded onto a ship for transporting carbon dioxide.

At this time, the liquid carbon dioxide may have a pressure of 5.5 bar to 19.7 bar, more preferably about 14.3 bar, and then be loaded onto the ship for transporting carbon dioxide.

As described above, the present invention provides a module for treatment of carbon dioxide and a treatment method thereof, in which carbon dioxide supplied at proper temperature and pressure to a demand side requiring liquid carbon dioxide having a cryogenic temperature for carbon dioxide capture and storage (CCS) or enhanced oil recovery (EOR).

INDUSTRIAL APPLICABILITY

It will be understood by a person having ordinary knowledge in the art that various modifications and applications not only to additional cooling and treatment for carbon dioxide but also to shipping or carbon dioxide capture and storage (CCS) or enhanced oil recovery (EOR) are possible within the scope of the present invention.

The invention claimed is:

1. A system for separating liquefied carbon dioxide, the system comprising:
   a separation unit comprising a controlled freezing zone (CFZ) and configured to process sour gas and to discharge methane upwards and a $CO_2$-containing composition downwards;
   an expansion valve configured to cool the $CO_2$-containing composition from the separation unit by expansion;
   a heat exchanger configured to further cool the $CO_2$-containing composition from the expansion valve by heat-exchanging with the methane from the separation unit; and
   a gas-liquid separator configured to receive the $CO_2$-containing composition from the heat exchanger and to separate a $CO_2$-enriched liquid composition therefrom for loading to a transportation vehicle.

2. The system according to claim 1, wherein temperature at an inlet of the expansion valve is higher than temperatures at a gas outlet and a liquid outlet of the gas-liquid separator.

3. The system according to claim 1, wherein the gas-liquid separator comprises:
- a liquid discharge pipe through which the $CO_2$-enriched liquid composition is discharged downwards in a saturated liquid state at −55° C. to −20° C.; and
- a flow control valve mounted on an end portion of the liquid discharge pipe and configured to control supply of the $CO_2$-enriched liquid composition to the transportation vehicle.

4. The system according to claim 1, wherein the gas-liquid separator comprises:
- a gas discharge pipe for discharging a gas composition separated from the $CO_2$-containing composition upwards; and
- a pressure control valve mounted on the gas discharge pipe.

5. A method for separating liquefied carbon dioxide in the system of claim 1, the method comprising:
- separating, by the separation unit, methane and carbon dioxide from sour gas, wherein methane is discharged upwards while a $CO_2$-containing composition is discharged downwards;
- expanding, by the expansion valve, the $CO_2$-containing composition received from the separation unit for cooling the $CO_2$-containing composition;
- heat-exchanging, in the beat exchanger, the $CO_2$-containing composition received from the expansion valve with the methane discharged from the separation unit for further cooling the $CO_2$-containing composition;
- receiving, by the gas-liquid separator, the $CO_2$-containing composition from the heat exchanger; and
- separating, from the received $CO_2$-containing composition by the gas-liquid separator, a $CO_2$-enriched liquid composition in a saturated liquid state at −55° C. to −20° C. for loading to a transportation vehicle.

* * * * *